(12) United States Patent
Sugimoto et al.

(10) Patent No.: US 12,384,897 B2
(45) Date of Patent: Aug. 12, 2025

(54) METHOD FOR SURFACE MODIFICATION OF FLUORORESIN

(71) Applicant: AGC Inc., Tokyo (JP)

(72) Inventors: Ryuichi Sugimoto, Kami (JP); Taiki Hoshino, Tokyo (JP); Eisuke Murotani, Tokyo (JP); Nobuyuki Otozawa, Tokyo (JP)

(73) Assignee: AGC Inc., Tokyo (JP)

( * ) Notice: Subject to any disclaimer, the term of this patent is extended or adjusted under 35 U.S.C. 154(b) by 692 days.

(21) Appl. No.: 17/580,824

(22) Filed: Jan. 21, 2022

(65) Prior Publication Data

US 2022/0144994 A1     May 12, 2022

Related U.S. Application Data

(63) Continuation of application No. PCT/JP2020/036399, filed on Sep. 25, 2020.

(30) Foreign Application Priority Data

Sep. 27, 2019   (JP) .................................. 2019-177652

(51) Int. Cl.
| | |
|---|---|
| *C08J 7/16* | (2006.01) |
| *C08F 259/08* | (2006.01) |
| *C08F 291/04* | (2006.01) |
| *C08K 5/3437* | (2006.01) |
| *C08K 5/55* | (2006.01) |
| *C08F 2/36* | (2006.01) |

(52) U.S. Cl.
CPC .............. *C08J 7/16* (2013.01); *C08F 259/08* (2013.01); *C08F 291/04* (2013.01); *C08K 5/3437* (2013.01); *C08K 5/55* (2013.01); *C08F 2/36* (2013.01); *C08L 2203/16* (2013.01)

(58) Field of Classification Search
CPC .............. C08F 259/08; C08J 7/16; C08J 7/18
See application file for complete search history.

(56) References Cited

U.S. PATENT DOCUMENTS

2013/0303702 A1    11/2013   Krayer et al.

FOREIGN PATENT DOCUMENTS

CN         104788622 A  *   7/2015

OTHER PUBLICATIONS

Machine translation of CN 104788622 (no date).*
International Search Report issued Nov. 24, 2020 in PCT/JP2020/036399 filed on Sep. 25, 2020, citing documents AA & AX-AY therein, 3 pages.
Okamura et al., "Generation of radical species on polypropylene by alkylborane-oxygen system and its application to graft polymerization", Journal of Polymer Science: Part A: Polymer Chemistry, vol. 47, No. 22, 2009, pp. 6163-6167.
Zhao et al., "Surface modification of polypropylene with poly (methyl methacrylate) initiated by a diethylzinc and 1,10-phenanthroline complex", Reactive and Functional Polymers, vol. 132, 2018, pp. 127-132.
Li et al., "Grafting zwitterionic brush on the surface of PVDF membrane using physisorbed free radical grafting technique", Journal of Membrane Science, vol. 405-406, 2012, pp. 141-148.

\* cited by examiner

*Primary Examiner* — Marc S Zimmer
(74) *Attorney, Agent, or Firm* — Oblon, McClelland, Maier & Neustadt, L.L.P.

(57) ABSTRACT

To provide a method for surface modification of a fluororesin, that enables graft polymerization at a lower temperature than a conventional method.
A method for surface modification of a fluororesin, which comprises reacting a fluororesin with a radical reactive compound in the presence of an organometallic compound.

20 Claims, 9 Drawing Sheets

METHOD FOR SURFACE MODIFICATION OF FLUORORESIN

TECHNICAL FIELD

The present invention relates to a method for surface modification of a fluororesin.

BACKGROUND ART

Fluororesins have such characteristics that they have excellent chemical and thermal stability as well as a low coefficient of friction. Because of these characteristics, fluororesins are expected to be applied in various fields, including the electronics field, the biotechnology field and the medical field.

Fluororesins are sometimes used in composites with other materials. However, fluororesins have low surface energy and are chemically stable, whereby they do not adhere well to other materials. In order to maximize the performance of fluororesins, it is essential to develop surface modification technologies that are suitable for the intended use.

Non-Patent Document 1 describes the grafting of sulfobetaine methacrylate (SBMA), as an amphoteric ionic monomer, onto the surface of a polyvinylidene fluoride (PVDF) film by a physisorption free radical grafting technique to improve the hydrophilicity.

The method for surface modification of a fluororesin described in Non-Patent Document 1 comprises grafting a radical reactive compound having a hydrophilic group on the surface of a fluororesin film in the presence of azoisobutyronitrile (AIBN). This method has such advantages that (1) the performance of the fluororesin is less likely to be impaired as compared with a case where the film is constituted by using a fluorinated polymer having a hydrophilic group; (2) the durability is superior as compared with a case where coating is applied to the surface of the fluororesin, and the productivity is high, since it is unnecessary to carry out pretreatment such as plasma treatment or corona treatment; and (3) as compared with a case where graft polymerization using electron beams, radiation, etc. is carried out, the loads on the human body and the environment are less, and it is possible to suppress the degradation of the fluororesin film.

PRIOR ART DOCUMENT

Non-Patent Document

Non-Patent Document 1: Li, Mi-Zi and six others, Grafting zwitterionic brush on the surface of PVDF membrane using physisorbed free radical grafting technique, Journal of Membrane Science, July 2012, Vol. 405-406, p. 141-148.

DISCLOSURE OF INVENTION

Technical Problem

However, the method for surface modification of a fluororesin as described in Non-Patent Document 1 is prone to side reactions, because the graft polymerization is carried out at a high temperature of at least 70° C.

The present invention has an object to provide a method for surface modification of a fluororesin, that enables graft polymerization at a lower temperature than the conventional method.

SOLUTION TO PROBLEM

[1] A method for surface modification of a fluororesin, which comprises reacting a fluororesin with a radical reactive compound in the presence of an organometallic compound.
[2] The method for surface modification of a fluororesin according to [1], wherein the fluororesin is in a film form or a particle form.
[3] The method for surface modification of a fluororesin according to [1] or [2], wherein the fluororesin is at least one type selected from the group consisting of a ethylene-tetrafluoroethylene copolymer, a perfluoro(alkyl vinyl ether)-tetrafluoroethylene copolymer, a vinylidene fluoride polymer, a vinyl fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, a hexafluoropropylene-tetrafluoroethylene copolymer, an ethylene-hexafluoropropylene-tetrafluoroethylene copolymer, a chlorotrifluoroethylene polymer, an ethylene-chlorotrifluoroethylene copolymer, a polytetrafluoroethylene and a propylene-chlorotrifluoroethylene copolymer.
[4] The method for surface modification of a fluororesin according to any one of [1] to [3], wherein the organometallic compound contains at least one element selected from the group consisting of Group 12 elements, Group 13 elements and Group 15 elements.
[5] The method for surface modification of a fluororesin according to any one of [1] to [4], wherein the organometallic compound is at least one type selected from the group consisting of a dialkyl zinc complex and a trialkylborane.
[6] The method for surface modification of a fluororesin according to any one of [1] to [5], wherein the organometallic compound is at least one type selected from the group consisting of a diethyl zinc 1,10-phenanthroline complex, a diethyl zinc 2,2'-bipyridine complex and a tributyl borane.
[7] The method for surface modification of a fluororesin according to any one of [1] to [6], wherein the radical reactive compound is at least one type selected from the group consisting of (meth)acrylic acid, a (meth)acrylate, a (meth)acrylonitrile, an N-substituted (meth)acrylamide, a vinyl ester, a vinyl ether, an aromatic vinyl compound and a heterocyclic vinyl compound.
[8] The method for surface modification of a fluororesin according to any one of [1] to [7], wherein the fluororesin and the radical reactive compound are reacted at a reaction temperature of from 5 to 65° C.
[9] The method for surface modification of a fluororesin according to any one of [1] to [8], wherein the fluororesin is reacted with the radical reactive compound in the presence of the organometallic compound and a co-catalyst.
[10] The method for surface modification of a fluororesin according to [9], wherein the co-catalyst is molecular oxygen.

ADVANTAGEOUS EFFECTS OF INVENTION

According to the present invention, it is possible to provide a method for surface modification of a fluororesin, that enables graft polymerization at a lower temperature than the conventional method.

Further, according to the present invention, the graft ratio of the radical reactive compound onto the surface of the fluororesin can be controlled within a more appropriate range.

Further, according to the present invention, it is possible to modify the surface of a fluororesin film, while suppressing the deformation of the fluororesin film.

DESCRIPTION OF EMBODIMENTS

Figure 1:
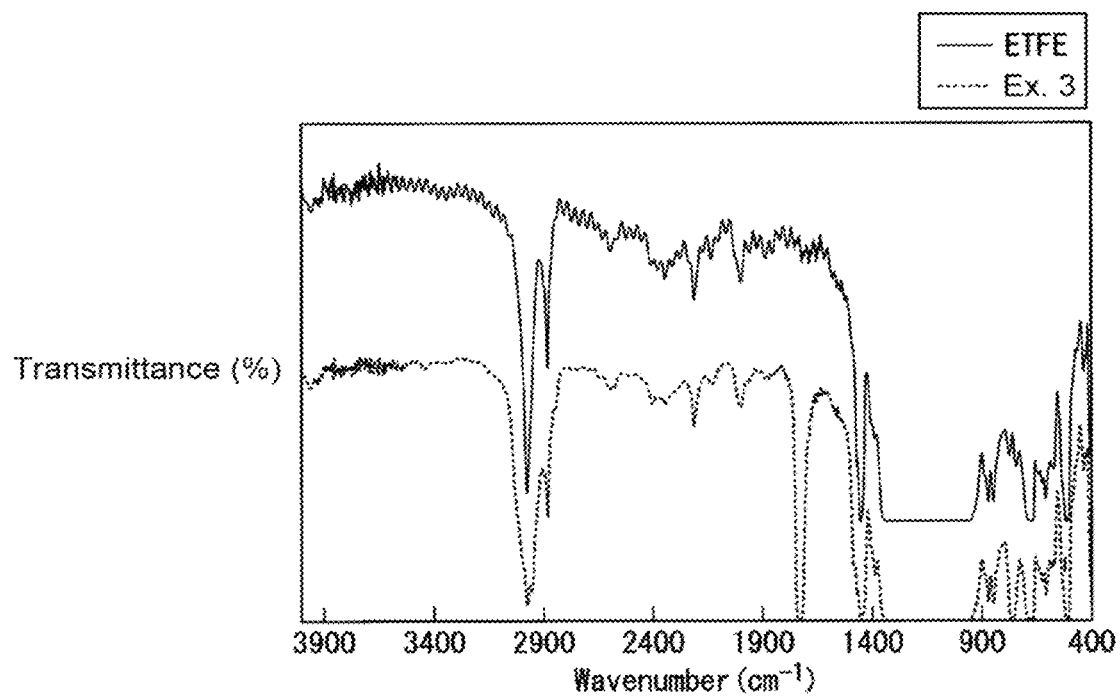
FIG. 1 is a chart showing the results of the FT-IR measurements of the ETFE film before and after graft polymerization in Ex. 3.
Figure 2:
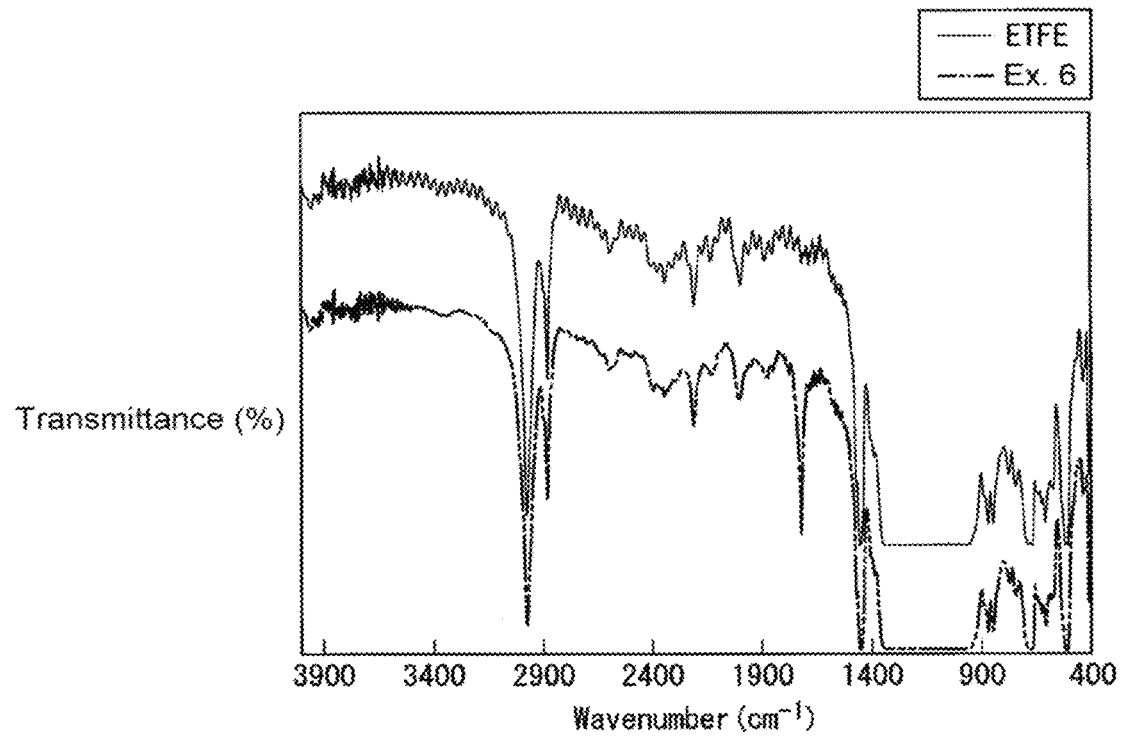
FIG. 2 is a chart showing the results of the FT-IR measurements of the ETFE film before and after graft polymerization in Ex. 6.
Figure 3:
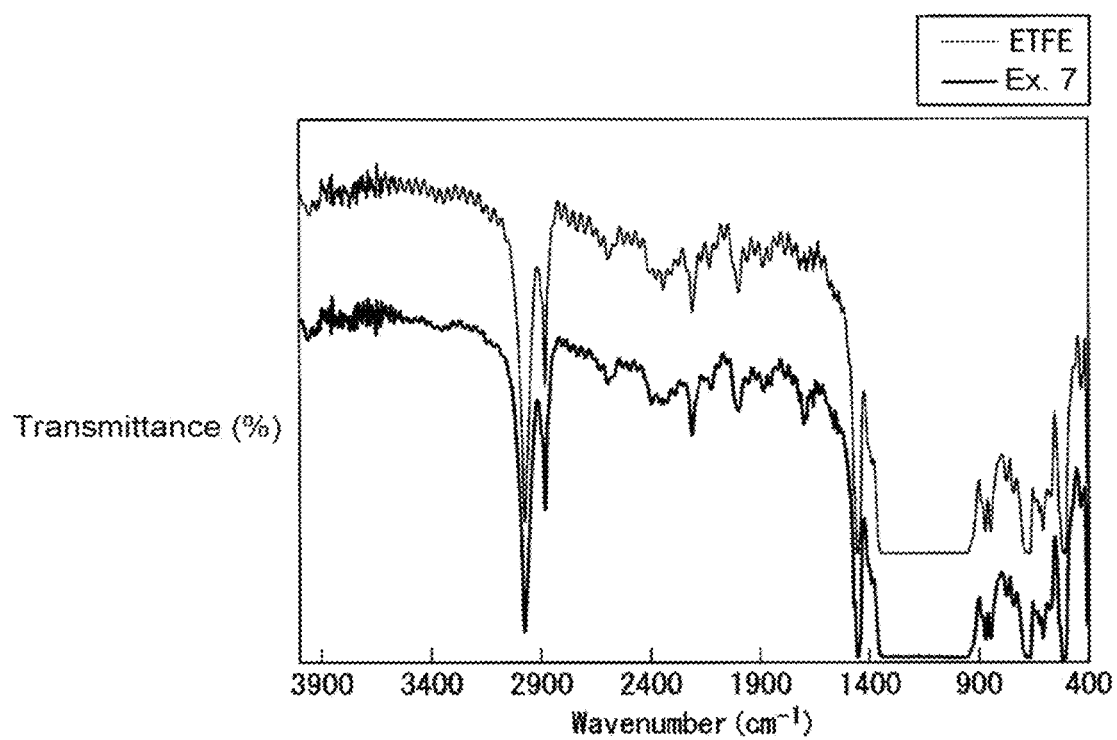
FIG. 3 is a chart showing the results of the FT-IR measurements of the ETFE film before and after graft polymerization in Ex. 7.
Figure 4:
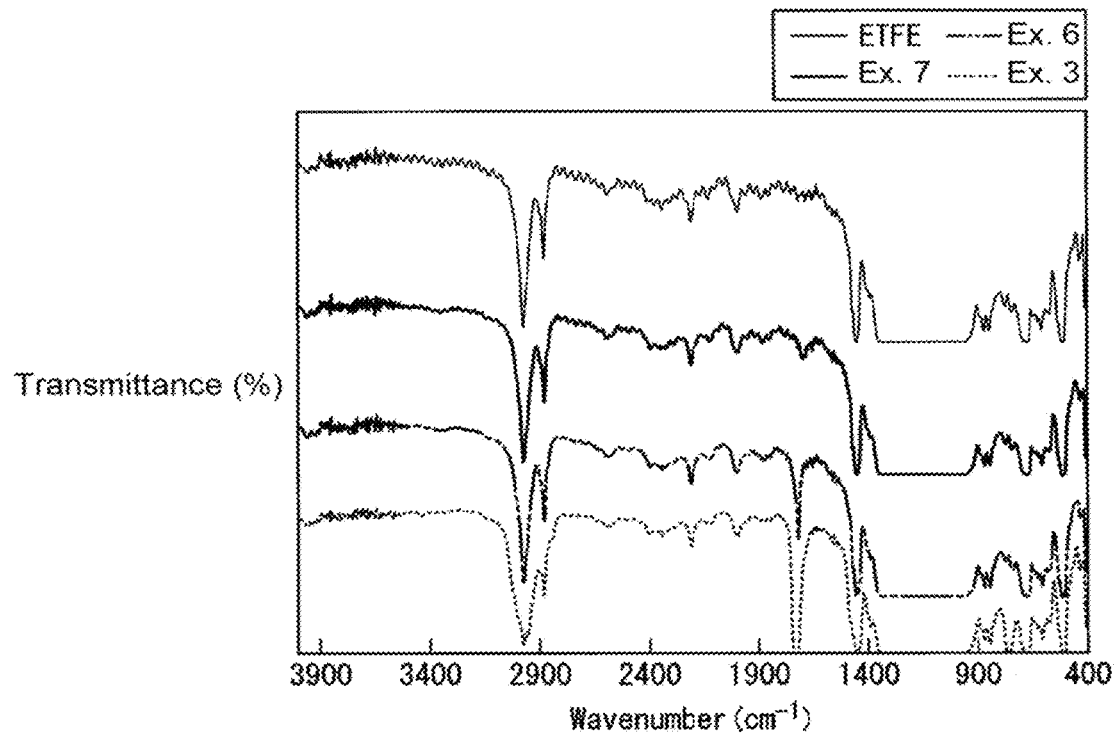
FIG. 4 is a chart showing the results of the FT-IR measurements of the ETFE films before and after graft polymerization in Ex. 3, 6 and 7.

The range of numerical values expressed by using "to" shall include the numerical values on both sides of "to".

The term "(meth)acrylic" encompasses acrylic and methacrylic. Similarly, "(meth)acrylate" encompasses acrylate and methacrylate. Similarly, "(meth)acrylonitrile" encompasses acrylonitrile and methacrylonitrile.

[Method for Surface Modification of a Fluororesin]

The method for surface modification of a fluororesin according to the present invention is characterized by reacting the fluororesin with a radical reactive compound in the presence of an organometallic compound.

<Fluororesin>

The fluororesin is a polymer containing units derived from an olefin containing fluorine atoms.

Specific examples of the above fluororesin are an ethylene-tetrafluoroethylene copolymer (ETFE), a perfluoro(alkyl vinyl ether)-tetrafluoroethylene copolymer (PFA), a vinylidene fluoride polymer (PVDF), a vinyl fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, a hexafluoropropylene-tetrafluoroethylene copolymer, an ethylene-hexafluoropropylene-tetrafluoroethylene copolymer, a chlorotrifluoroethylene polymer, an ethylene-chlorotrifluoroethylene copolymer, a polytetrafluoroethylene (PTFE), and a propylene-chlorotrifluoroethylene copolymer.

As said fluororesin, at least one type selected from the group consisting of these fluororesins is preferred, at least one type selected from the group consisting of ETFE, PFA, PVDF and PTFE is more preferred, and ETFE is particularly preferred.

ETFE, PFA and PVDF are excellent in mechanical strength, heat resistance and moldability, and can be used in a wide range of applications. Among them, ETFE is a well-balanced fluororesin provided with mechanical properties and moldability while maintaining excellent chemical resistance and electrical properties.

The shape of the fluororesin may be either a film form or a particle form.

In a case where the fluororesin is in the form of a film, the thickness of the film is preferably from 10 to 1,000 μm, more preferably from 12 to 500 μm, further preferably from 15 to 200 μm. When the thickness of the film is within such a range, the film will be easy to handle since the balance between strength and flexibility will be good, and the properties of the fluororesin will be more easily demonstrated.

Here, the thickness of the fluororesin film is the value measured by a micrometer.

In a case where the fluororesin is in the form of particles, the average particle size of the particles is preferably from 0.1 to 1,000 μm, more preferably from 0.5 to 500 μm, further preferably from 1 to 20 μm. When the average particle size is within such a range, the processability and handling will be excellent, and the properties of the fluororesin will be more easily demonstrated.

Here, the average particle size of the fluororesin particles is measured by e.g. a laser diffraction/scattering method.

<Radical Reactive Compound>

The radical reactive compound is a compound in which the polymerization reaction proceeds by radical chain reaction.

Specific examples of the radical reactive compound are (meth)acrylic acid, a (meth)acrylic ester, a (meth)acrylonitrile, an N-substituted (meth)acrylamide, a vinyl ester, a vinyl ether, an aromatic vinyl compound and a heterocyclic vinyl compound.

As said radical reactive compound, at least one member selected from the group consisting of these compounds is preferred, at least one type selected from the group consisting of (meth)acrylic acid, methyl (meth)acrylate, ethyl (meth)acrylate, butyl (meth)acrylate, 2-hydroxyethyl (meth)acrylate, 2-hydroxypropyl (meth)acrylate, glycidyl (meth)acrylate, ethylene glycol di(meth)acrylate, polyethylene glycol di(meth)acrylate, neopentyl glycol di(meth)acrylate, vinyl acetate, vinyl propionate, styrene and N-vinylpyrrolidone, is more preferred, at least one type selected from the group consisting of (meth)acrylic acid, methyl (meth)acrylate, ethyl (meth)acrylate, butyl (meth)acrylate, glycidyl (meth)acrylate and N-vinylpyrrolidone, is further preferred, and methyl (meth)acrylate is particularly preferred.

The acrylic compound, such as (meth)acrylic acid, (meth)acrylic ester, (meth)acrylonitrile and N-substituted (meth)acrylamide, are preferred because a wide variety of compounds are readily available and polymerization is easy, and it is easy to select an appropriate compound for the desired surface condition.

In a case where the fluororesin is in the form of a film, the amount of the radical reactive compound to be used is preferably from 0.001 to 1,000 moles, more preferably from 0.01 to 500 moles, further preferably from 0.05 to 400 moles, per 1 $m^2$ of the surface area of the surface to be treated. Here, in a case where the scale at the time of production is large, from 0.001 to 50 moles is preferred, from 0.01 to 20 moles is more preferred, and from 0.05 to 10 moles is further preferred. In a case where the fluororesin is in the form of particles, e.g. in a case where the average particle diameter is from 1 to 100 μm, from 0.0001 to 10 moles is preferred, from 0.001 to 50 moles is more preferred, and from 0.01 to 10 moles is further preferred, per 1 $m^2$ of the surface area of the surface to be treated.

When the amount of the radical reactive compound to be used is within such a range, graft polymerization can be carried out in a shorter time.

<Organometallic Compound>

The above-mentioned organometallic compound functions as a radical initiator in the method for modification of a fluororesin according to the present invention. The above-mentioned organometallic compound is one capable of generating radicals at a lower temperature than before, specifically at a temperature of at most 65° C.

The organometallic compound is preferably one containing at least one element selected from the group consisting of Group 12 elements, Group 13 elements and Group 15 elements of the IUPAC (International Union of Pure and Applied Chemistry) periodic table. Examples of Group 12 elements are zinc, cadmium and mercury, examples of Group 13 elements are boron and aluminum, and an example of Group 15 element is antimony.

As the organometallic compound, at least one type selected from the group consisting of a dialkyl zinc complex and a trialkylborane is more preferred. As the alkyl group of the dialkyl zinc complex and the trialkylborane, a $C_{1-6}$ alkyl group is preferred, and among them, an ethyl group and a butyl group are particularly preferred. As the dialkyl zinc complex and the trialkylborane, at least one type selected from the group consisting of diethyl zinc 1,10-phenanthroline complex, diethyl zinc 2,2'-bipyridine complex and tributyl borane, is further preferred, and diethyl zinc 1,10-phenanthroline complex is particularly preferred.

The dialkyl zinc complex and the trialkylborane have different states depending on the number of carbon atoms of the alkyl group and the temperature range. For example, in the reaction temperature range, diethyl zinc 1,10-phenanthroline complex is solid and tributyl borane is liquid. In the case of a liquid, it can be used in the reaction as it is, or it can be diluted with a solvent and used in the reaction. In the case of a solid, it may be diluted with a solvent and used in the reaction, and if the radical reactive compound is a liquid, it may be used as it is in the reaction. When it is used as it is, the reaction proceeds easily because it is not diluted.

By the dialkyl zinc complex and the trialkylborane, the graft polymerization can be carried out in a short time of at most 24 hours, even at a low temperature of at most 50° C.

Further, the trialkylborane is also preferred as a radical initiator because it is easy to carry out the graft polymerization even if the type of the radical reactive compound or the fluororesin is changed.

As the organometallic compound, a commercial product may be purchased and used, or it may be synthesized by a conventional known synthetic method and used. For example, diethyl zinc 1,10-phenanthroline complex (PhenDEZ) can be synthesized by the method described in Examples given below.

The amount of the organometallic compound to be used is preferably from 0.001 to 1 mol, more preferably from 0.001 to 0.5 mol, further preferably from 0.005 to 0.05 mol, to 1 mol of the radical reactive compound.

<Co-Catalyst>

In the method for modification of a fluororesin of the present invention, the fluororesin may be reacted with the radical reactive compound in the presence of the organometallic compound and the co-catalyst.

When the co-catalyst is used, it is possible to promote or adjust the radical formation from the organometallic compound.

Examples of the co-catalyst are a metal oxide, an alcohol, a quinone, a hydroquinone, oxygen, carbon disulfide, an amine, water and hydrogen peroxide.

As the co-catalyst, at least one type selected from the group consisting of these compounds is preferred, oxygen is more preferred, and molecular oxygen ($O_2$) is further preferred.

When oxygen is used as the co-catalyst, the radical formation reaction proceeds more efficiently, and the grafting reaction can be carried out in a shorter time even at a low temperature of at most 65° C.

<Solvent>

In the method for modification of a fluororesin of the present invention, a solvent may be used.

The solvent is not particularly limited, so long as it is one capable of dissolving or dispersing the organometallic compound, the radical reactive compound and the co-catalyst to be optionally used.

As the solvent, one capable of dissolving or dispersing the organometallic compound is preferred, and it may be suitably selected depending on the type of organometallic compound.

For example, in a case where the organometallic compound is a dialkyl zinc complex, a non-polar solvent such as toluene or xylene is preferred.

The concentration of the dialkyl zinc complex at the time of using the solvent, is not particularly limited, but from 0.01 to 5.0 M is preferred, from 0.02 to 3.0 M is more preferred, and from 0.05 to 2.0 M is further preferred.

Further, for example, in a case where the organometallic compound is a trialkylborane, it is preferred that the trialkylborane is dissolved in a non-polar organic solvent such as hexane, and then mix it with water containing a surfactant, so as to be used as an oil-in-water emulsion. As the surfactant, sodium dodecyl sulfate (SDS), cetyltrimethylammonium bromide (CTAB), etc. may be used. The concentration of the surfactant is not particularly limited, but 0.001 to 5.0 mass % is preferred, from 0.005 to 3.0 mass % is more preferred, and from 0.01 to 1.0 mass % is furthermore preferred.

The concentration of the trialkylborane at the time of using the solvent is not particularly limited, but from 0.01 to 5.0 M is preferred, from 0.02 to 3.0 M is more preferred, and 0.05 to 2.0 M is further preferred.

The amount of solvent to be used is not particularly limited, but if too much, the concentration of the organometallic compound and the radical reactive compound will decrease, whereby the reaction rate becomes smaller, such being not desirable.

In the method for modification of a fluororesin of the present invention, it is desirable not to use a solvent if the organometallic compound is liquid in the reaction temperature range.

<Reaction Conditions>

The reaction temperature is preferably at most 65° C., more preferably at most 60° C., further preferably at most 55° C. The lower limit of the reaction temperature is not particularly limited, but is usually 0° C., preferably 5° C.

The reaction time is preferably from 0.1 to 36 hours, more preferably from 0.2 to 24 hours, further preferably from 0.5 to 18 hours, particularly preferably from 1 to 12 hours. The reaction time can be suitably set depending on the types and amounts of the organometallic compound and the radical reactive compound, the reaction temperature, etc.

The reaction atmosphere is preferably a non-oxidizing atmosphere. The non-oxidizing atmosphere is preferably an argon gas atmosphere, a nitrogen gas atmosphere, or a hydrogen gas atmosphere. By conducting the grafting reaction in a non-oxidizing atmosphere, it is possible to further suppress the formation of byproducts.

<Graft Ratio>

The graft ratio to be achieved by the method for surface modification of a fluororesin of the present invention, is usually from 0.0005% to 25%, preferably from 0.001 to 20%, more preferably from 0.001 to 10%.

Here, the graft ratio is one calculated by the following formula.

Graft ratio (%)={(mass of fluororesin after surface modification−mass of fluororesin before surface modification)/mass of fluororesin before surface modification}×100 (%)

[Surface Modified Fluororesin]

The surface modified fluororesin obtained by the method for surface modification of a fluororesin of the present invention (hereinafter referred to as "the surface modified fluororesin of the present invention") is one having a radical reactive compound grafted onto the surface of the fluororesin.

The surface of the surface modified fluororesin of the present invention changes the surface properties as compared to the surface of the untreated fluororesin.

Specifically, the contact angle of the surface of the surface modified fluororesin of the present invention to water (hereinafter may be referred to simply as "water contact angle") is smaller than the water contact angle of the surface of the untreated fluororesin.

The water contact angle of the surface of the surface modified fluororesin of the present invention is usually less than 95°, preferably at most 90°, more preferably at most 80°, further preferably at most 70°.

Here, the water contact angle is a value obtained by measuring the contact angle of about 2 µL of distilled water placed on the surface of a substrate, under conditions of 25° C., 50% RH, by using a contact angle measurement device (PGX manufactured by Testing Machines Inc.).

Further, the water absorption capacity of the surface modified fluororesin of the present invention is larger than that of the untreated fluororesin.

The water absorption capacity of the surface modified fluororesin of the present invention is expressed in grams of water that 1 g of the surface modified resin of the present invention can absorb, and at least 0.05 g/g is preferred, at least 0.1 g/g is more preferred, and at least 0.4 g/g is further preferred. The upper limit of the water absorption capacity is not particularly limited, but is usually 1 g/g.

The water absorption capacity (g/g) is calculated by the following formula.

Water absorption capacity (g/g)=(mass of fluororesin after water absorption−mass of fluororesin before water absorption)/mass of fluororesin before water absorption (g/g)

In the method for surface modification of a fluororesin of the present invention, it is desirable to increase the surface area per 1 kg of the fluororesin in order to increase the water absorption capacity to graft a radical reactive compound onto the surface of the fluororesin. For example, the surface area per 1 kg of the fluororesin can be increased by using a particulate fluororesin and reducing the average particle size of the particles.

EXAMPLES

In the following, the present invention will be described in more detail with reference to Examples. The present invention is not limited to Examples as described below, and various variations are possible so long as they do not change the gist of the invention.

Ex. 1 to 15 and 19 to 23 correspond to the Examples of the present invention, and Ex. 16 to 18 correspond to Comparative Examples.

Abbreviations to be used in Examples are as follows.
Fluororesin
  ETFE: Ethylene-tetrafluoroethylene copolymer
  PVDF: Vinylidene fluoride polymer
  PFA: Perfluoro(alkyl vinyl ether)-tetrafluoroethylene copolymer
  PTFE: Polytetrafluoroethylene
Initiator
  Phen-DEZ: Diethyl zinc 1,10-phenanthroline complex
  TBB: Tributyl borane
  BPO: Benzoyl peroxide
  AIBN: Azobisisobutyronitrile
Radical reactive compound
  MMA: Methyl methacrylate
  GMA: Glycidyl methacrylate
  VP: Vinyl pyrrolidone
  AA: Acrylic acid

[Synthesis of Phen-DEZ]

Under an argon atmosphere, to a 50 mL two-necked flask, 1.08 g of 1,10-phenanthroline and 15 mL of hexane were added and stirred at 23° C. Then, 0.7 mL of diethyl zinc was added dropwise into the flask, and the mixture was further stirred for 24 hours. After the stirring, the precipitated reddish-orange powdery solid was filtered off and dried in vacuum for 12 hours to obtain 1.64 g (85% yield) of 1,10-phenanthroline-diethyl zinc complex (Phen-DEZ).

[Ex. 1]

The graft polymerization was carried out in an argon gas atmosphere. An ETFE film (Fluon (registered trademark) ETFE, manufactured by AGC Inc.; thickness: 100 μm) of 10 mm×10 mm was immersed in a reaction solution having 0.40 mmol (120 mg) of Phen-DEZ and 40 mmol of MMA mixed. With stirring, molecular oxygen ($O_2$) in an equimolar amount (0.40 mmol) to Phen-DEZ was added, and the mixture was stirred at 23° C. for 18 hours. The ETFE film was pulled up, and Soxhlet extraction was carried out for 12 hours with chloroform to remove the ungrafted MMA. By the Fourier transform infrared spectroscopy (FT-IR) measurements (measurement conditions are described below), the C=O absorption peak derived from MMA was confirmed. Further, by the scanning electron microscopy-energy dispersive X-ray spectroscopy (SEM-EDX) measurements, the peak of O atoms was confirmed on the polymer surface.

The graft ratio was calculated by the following formula after confirming the absorption peak of C=O derived from MMA by FT-IR measurements.

Graft ratio (%)={(mass of fluororesin after surface modification−mass of fluororesin before surface modification)/mass of fluororesin before surface modification}×100 (%)

In Ex. 1, "fluororesin after surface modification" means the ETFE film after graft polymerization, and "fluororesin before surface modification" means the ETFE film before graft polymerization.

The FT-IR measurements were conducted by a transmission method by using the FT/IR-480 plus manufactured by JASCO Corporation.

[Ex. 2 to 4]

The graft polymerization was carried out in the same manner as in Ex. 1, except that the reaction temperature and reaction time were changed as shown in Table 1.

The graft ratio was calculated and shown in the "Graft ratio" column of Table 1.

For Ex. 4, the water contact angle of the surface of the surface modified ETFE film was obtained. The results are shown in the "Water contact angle" column of Table 1.

The method for measuring the water contact angle followed the method as described above.

In FIGS. 1 to 4, the results of the FT-IR measurements of ETFE films before and after graft polymerization in Ex. 3, 6 and 7 are shown.

[Ex. 5]

The graft polymerization was carried out in the same manner as in Ex. 4, except that 2.0 mL of toluene was used as the solvent.

The graft ratio was calculated and shown in the "Graft ratio" column of Table 1.

[Ex. 6 and 7]

The graft polymerization was carried out in the same manner as in Ex. 1, except that the radical reactive compound was changed to GMA or VP as shown in Table 1, and the reaction temperature and time were changed as shown in Table 1.

The graft ratio was calculated and shown in the "Graft ratio" column of Table 1.

[Ex. 8]

The graft polymerization was carried out in the same manner as in Ex. 1, except that instead of the ETFE film, a PVDF film (Kynar (registered trademark) PVDF, manufactured by ARKEMA; thickness: 130 μm) was used, and the reaction temperature and time were changed as shown in Table 1.

The graft ratio was calculated and shown in the "Graft ratio" column of Table 1.

In Ex. 8, the thickness of the PVDF film was 120 μm before the graft polymerization, but increased to 130 μm after the graft polymerization.

Figure 5:
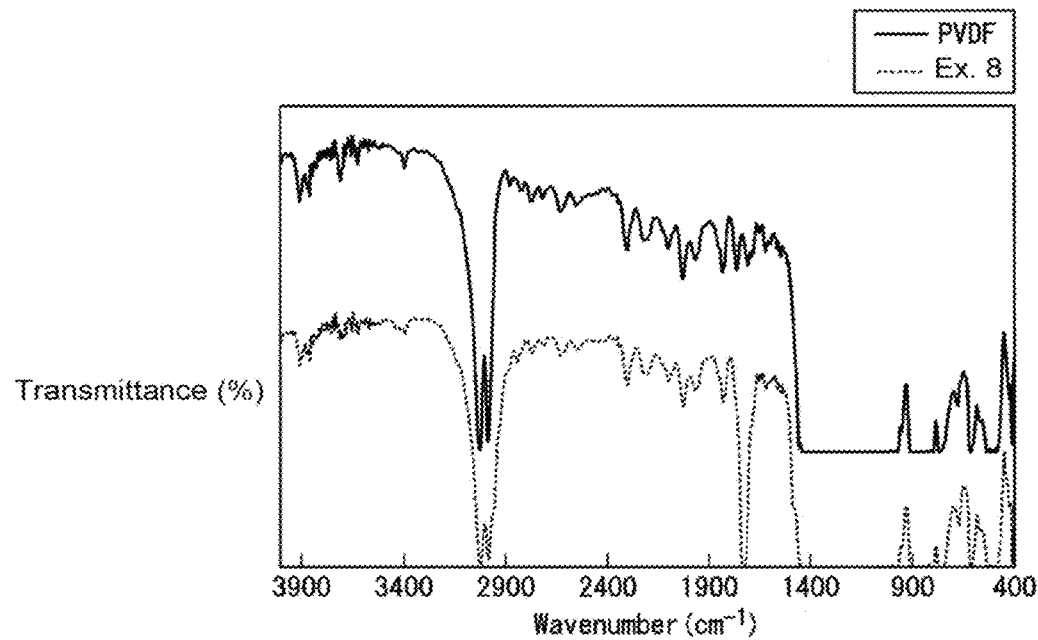
FIG. 5 is a chart showing the results of the FT-IR measurements of the PVDF film before and after graft polymerization in Ex. 8.

In FIG. 5, the results of the FT-IR measurements of the PVDF film before and after the graft polymerization in Ex. 8 are shown.

[Ex. 9 to 11]

The graft polymerization was carried out in the same manner as in Ex. 1, except that instead of Phen-DEZ, TBB (hexane solution with a concentration of 0.1 M) was used in the amount shown in Table 1, VP was used as a radical reactive compound in the amount shown in Table 1, an SDS aqueous solution (20 g of SDS is contained in a 100 mL aqueous solution) was used as a solvent in the amount shown in Table 1, and the reaction temperature and reaction time were changed as shown in Table 1.

The graft ratio calculated for Ex. 11 is shown in the "Graft ratio" column of Table 1.

Figure 6:
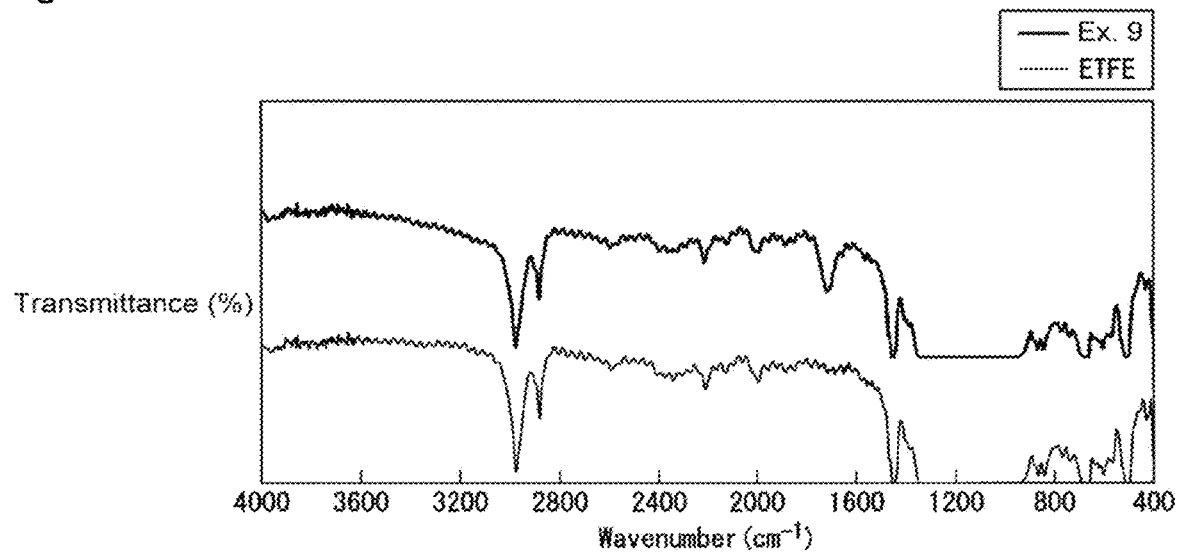
FIG. 6 is a chart showing the results of the FT-IR measurements of the ETFE film before and after graft polymerization in Ex. 9.

In FIG. 6, the results of the FT-IR measurements of the ETFE film before and after the graft polymerization in Ex. 9 are shown.

Figure 7:
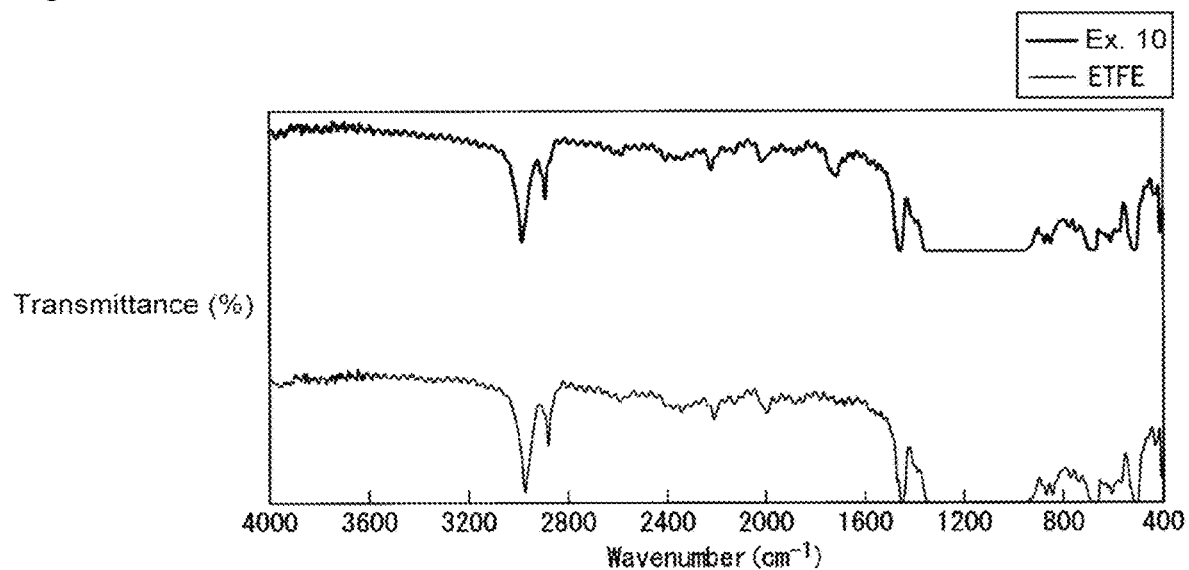
FIG. 7 is a chart showing the results of the FT-IR measurements of the ETFE film before and after graft polymerization in Ex. 10.

In FIG. 7, the results of the FT-IR measurements of the ETFE film before and after the graft polymerization in Ex. 10 are shown.

[Ex. 12 to 14]

The graft polymerization was carried out in the same manner as in Ex. 1, except that as shown in Table 1, the ETFE film, the PVDF film or the PFA film (Fluon (registered trademark) PFA, manufactured by AGC Inc.; thickness: 100 μm) was used, instead of Phen-DEZ, TBB (hexane solution with a concentration of 1.0 M) was used in the amount shown in Table 1, and the reaction temperature and reaction conditions were changed as shown in Table 1.

The calculated graft ratio is shown in the "Graft ratio" column of Table 1.

In Ex. 12, the thickness of the ETFE film was 100 μm before the graft polymerization, but increased to 120 μm after the graft polymerization.

In Ex. 13, the thickness of the PVDF film was 120 μm before the graft polymerization, but increased to 132 μm after the graft polymerization.

In Ex. 14, the thickness of the PFA film was 100 μm before the graft polymerization, but increased to 105 μm after the graft polymerization.

Figure 8:
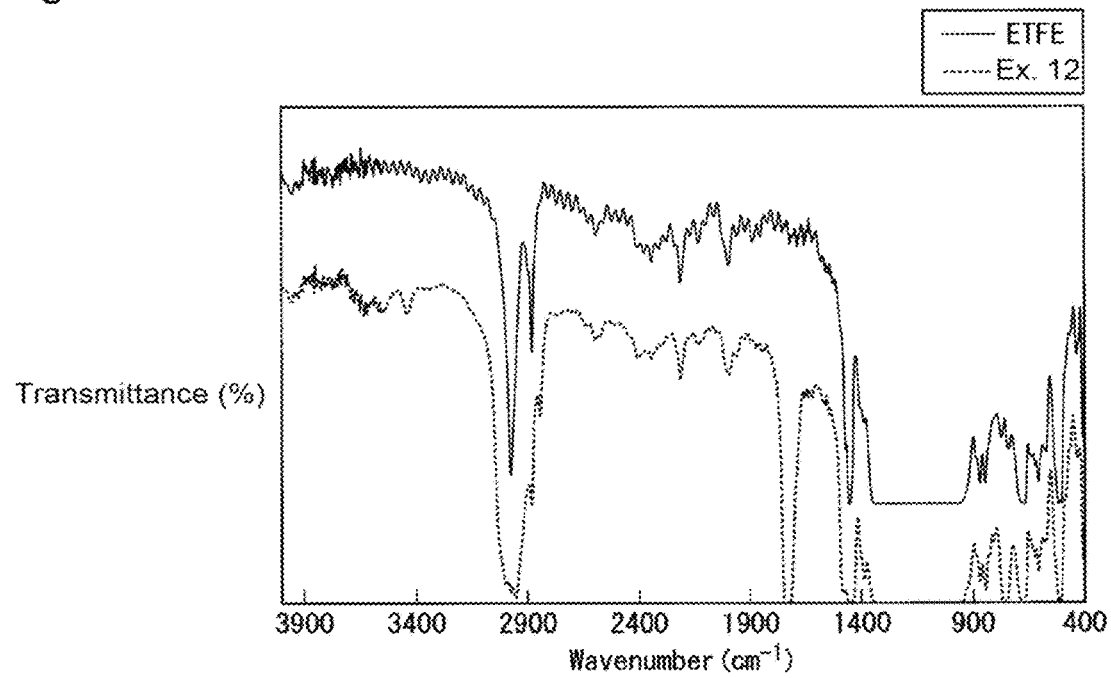
FIG. 8 is a chart showing the results of the FT-IR measurements of the ETFE film before and after graft polymerization in Ex. 12.

In FIG. 8, the results of the FT-IR measurements of the ETFE film before and after the graft polymerization in Ex. 12 are shown.

Figure 9:
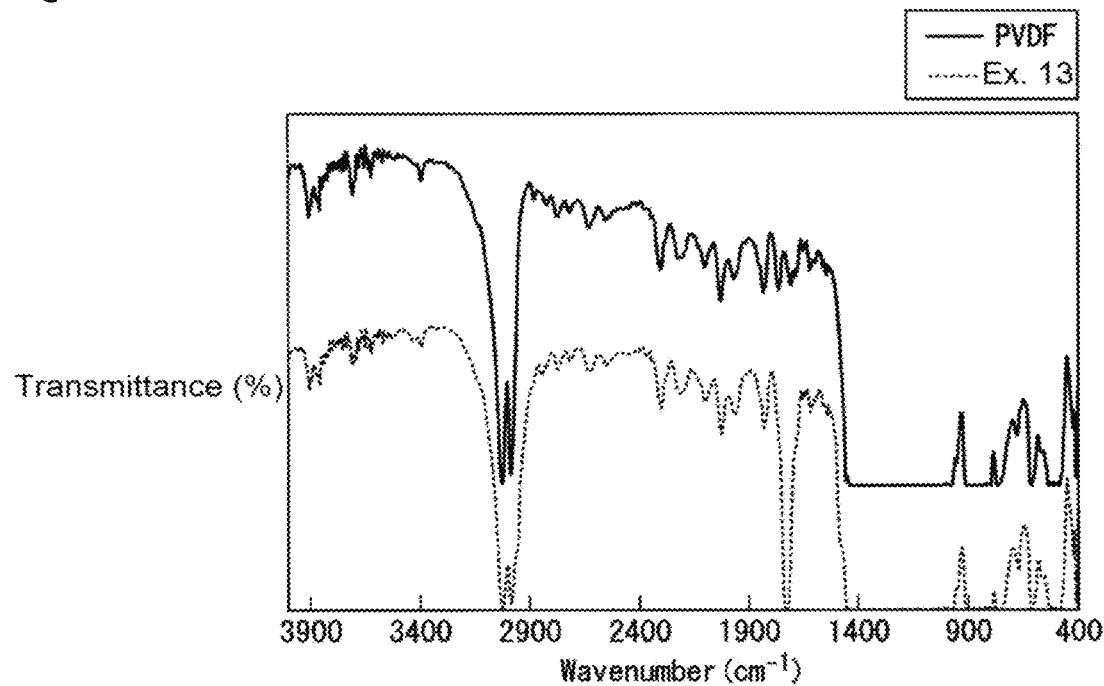
FIG. 9 is a chart showing the results of the FT-IR measurements of the PVDF film before and after graft polymerization in Ex. 13.
Figure 10:
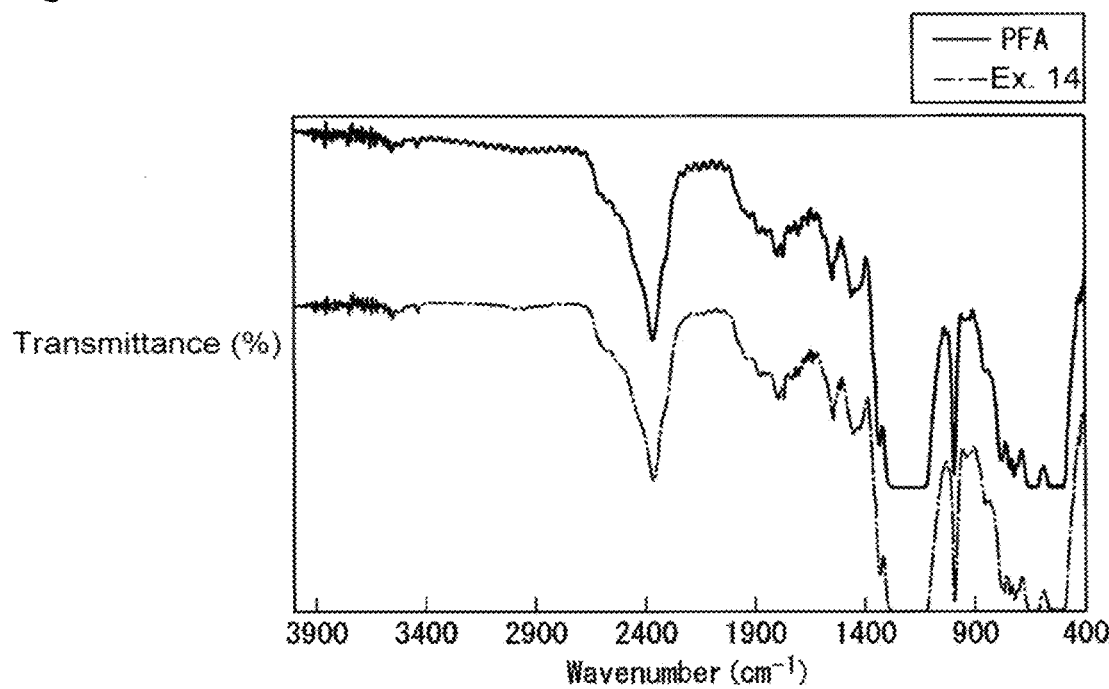
FIG. 10 is a chart showing the results of the FT-IR measurements of the PFA film before and after graft polymerization in Ex. 14.

In FIG. 9, the results of the FT-IR measurements of the PVDF film before and after the graft polymerization in Ex. 13 are shown.

Figure 11:
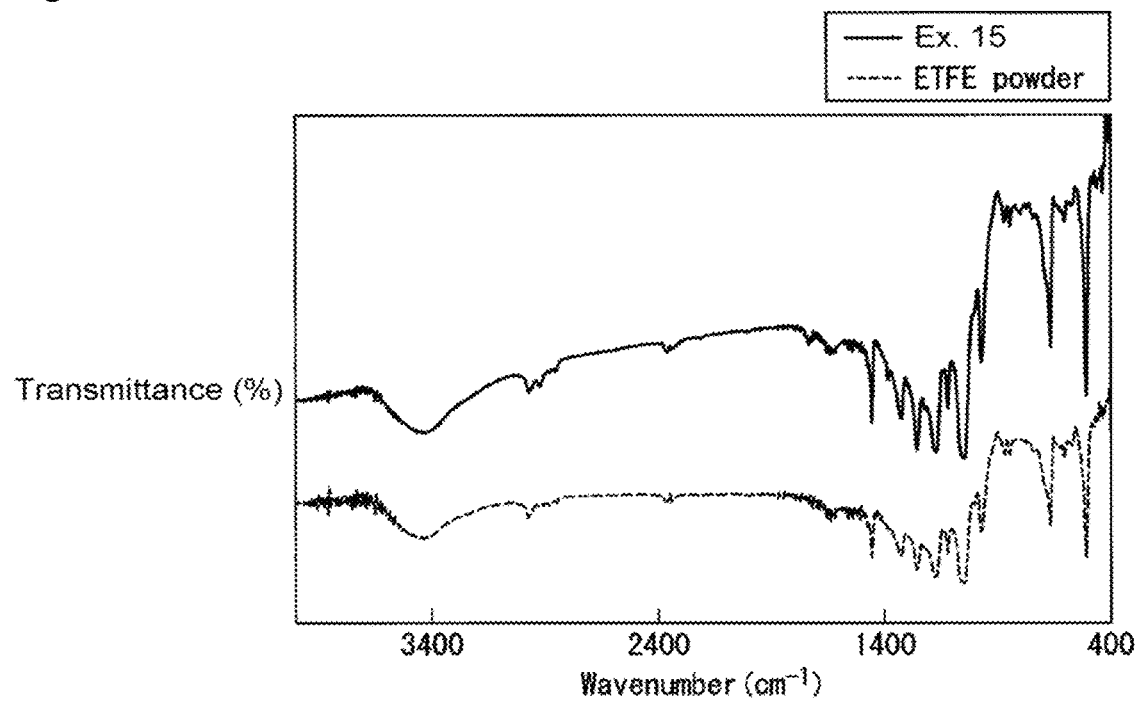
FIG. 11 is a chart showing the results of the FT-IR measurements of the ETFE particles before and after graft polymerization in Ex. 15.

In FIG. 11, the results of the FT-IR measurements of the PFA film before and after the graft polymerization in Ex. 14 are shown.

[Ex. 15]

The graft polymerization was carried out in an argon atmosphere. 215 mg of an ETFE powder (Fluon (registered trademark)) ETFE C-88 NM manufactured by AGC Inc., average particle size: 100 μm) was put in a flask, and 120 mg of Phen-DEZ, 3.77 g of MMA and a solvent were added. While stirring, oxygen in an amount equimolar to Phen-DEZ was added, and the stirring was continued at 50° C. for 24 hours. The ETFE powder was collected by filtration, and in order to remove the ungrafted polymer, Soxhlet extraction was carried out with chloroform for 12 hours. From the results of the FT-IR measurements, the C=O absorption peak derived from PMMA was confirmed. Further, from the SEM-EDX measurements, the peak of O atoms was confirmed on the polymer surface.

In FIG. 11, the results of the FT-IR measurements of the ETFE particles before and after the graft polymerization in Ex. 15 are shown.

[Ex. 16]

A 10 mm×10 mm ETFE film (Fluon (registered trademark) ETFE, manufactured by AGC Inc.; thickness: 100 μm) was used without applying surface modification.

The measured water contact angle is shown in the "Water contact angle" column of Table 1.

The water absorption capacity calculated by the following equation is shown in the "Water absorption capacity" column of Table 1.

Water absorption capacity (g/g)=(mass of fluororesin after water absorption–mass of fluororesin before water absorption)/mass of fluororesin before water absorption

[Ex. 17 and 18]

The graft polymerization was carried out in the same manner as in Ex. 1, except that BPO or AIBN was used as an initiator as shown in Table 1, the amounts of the radical reactive compound (MMA) and the solvent (toluene) were set to be the amounts shown in Table 1, the co-catalyst ($O_2$) was not used, and the reaction temperature and the reaction time were changed as shown in Table 1.

The calculated graft ratio is shown in the "Graft ratio" column of Table 1.

Figure 12:
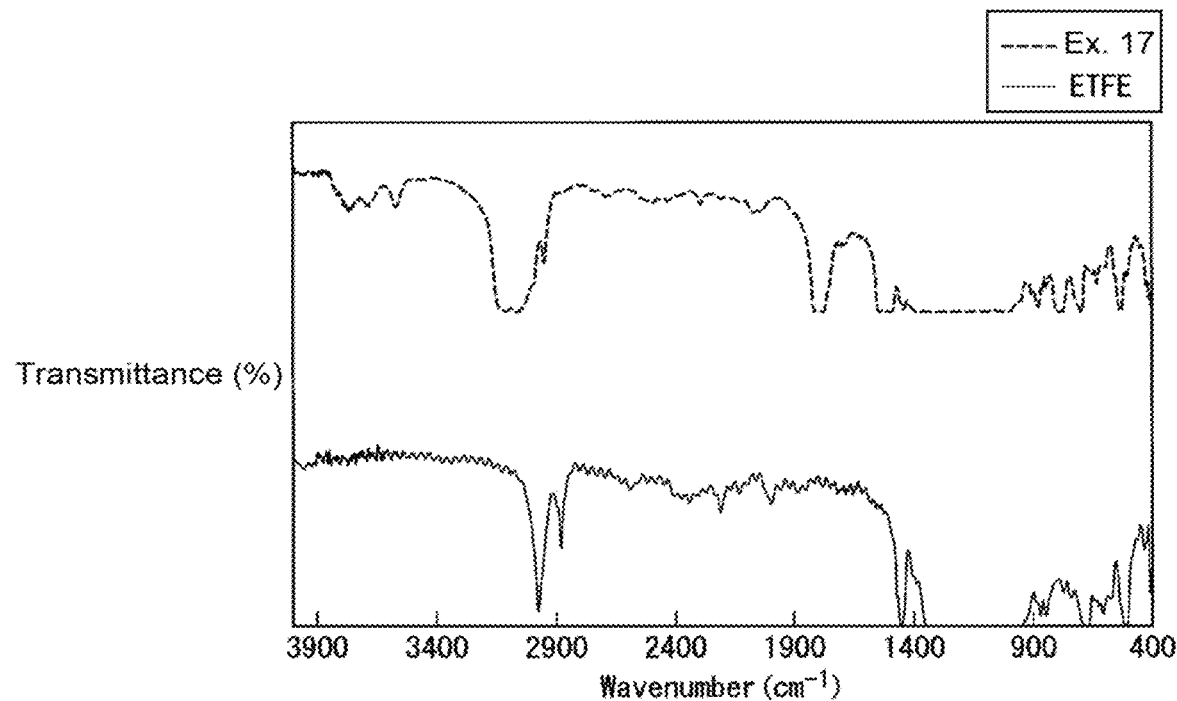
FIG. 12 is a chart showing the results of the FT-IR measurements of the ETFE film before and after graft polymerization in Ex. 17.

In FIG. 12, the results of the FT-IR measurements of the ETFE film before and after the graft polymerization in Ex. 17 are shown.

Figure 13:
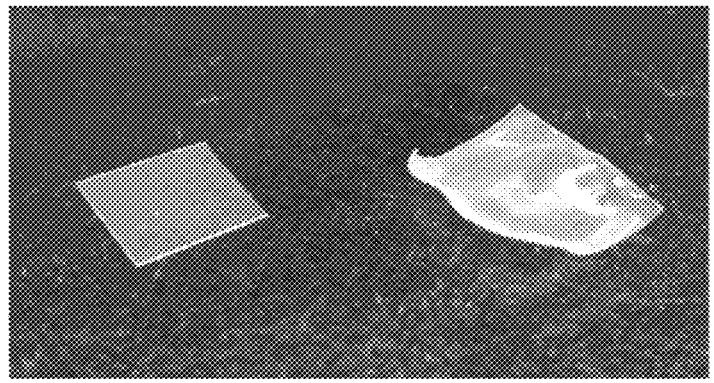
FIG. 13 is a photograph showing the appearance of the ETFE film before and after graft polymerization in Ex. 17 (left: before graft polymerization, right: after graft polymerization).

In FIG. 13, the appearance of the ETFE film before and after the graft polymerization in Ex. 17 (left: before the graft polymerization, right: after the graft polymerization) is shown.

Figure 14:
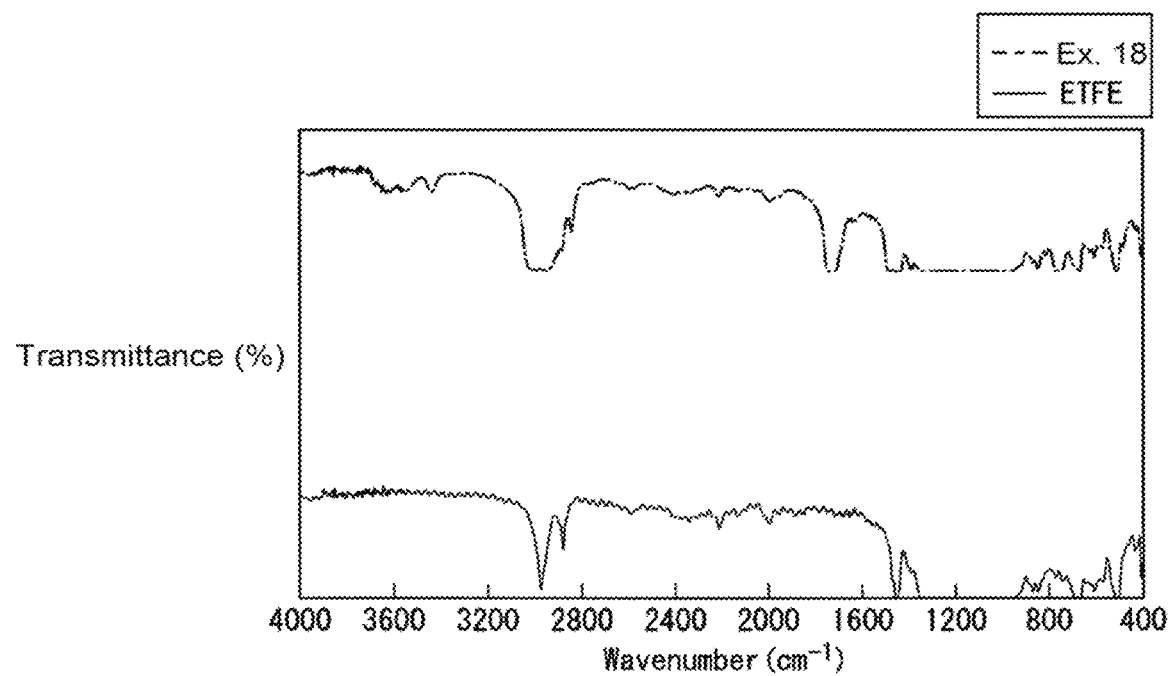
FIG. 14 is a chart showing the results of the FT-IR measurements of the ETFE film before and after graft polymerization in Ex. 18.

In FIG. 14, the results of the FT-IR measurements of the ETFE film before and after the graft polymerization in Ex. 18 are shown.

Figure 15:
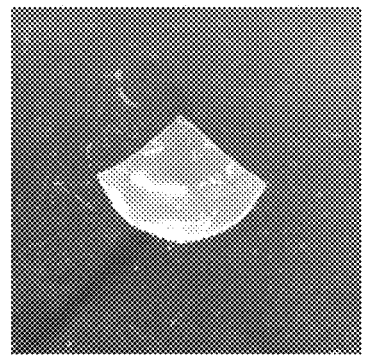
FIG. 15 is a photograph showing the appearance of the ETFE film after graft polymerization in Ex. 18.

In FIG. 15, the appearance of the ETFE film after the graft polymerization in Ex. 18 is shown.

[Ex. 19 and 20]

In Ex. 19, the graft polymerization was carried out in the same manner as in Ex. 14, except that no co-catalyst ($O_2$) was used. The calculated graft ratio is shown in the "Graft ratio" column of Table 1.

In Ex. 20, the graft polymerization was carried out in the same manner as in Ex. 14, except that 6.0 mL of toluene was used as the solvent. The calculated graft ratio is shown in the "Graft ratio" column of Table 1.

[Ex. 21]

In Ex. 21, the graft polymerization was carried out in the same manner as in Ex. 1, except that the radical reactive compound was changed to GMA as shown in Table 1, instead of Phen-DEZ, TBB (hexane solution with a concentration of 1.0 M) was used in the amount shown in Table 1, 4.0 mL of toluene was used as a solvent, and the reaction temperature and the reaction time were changed as shown in Table 1. The calculated graft ratio is shown in the "Graft ratio" column of Table 1.

[Ex. 22 and 23]

The graft polymerization was carried out in the same manner as in Ex. 1, except that as shown in Table 1, a PTFE film (7-358-02 Naflon (registered trademark) tape (PTFE), manufactured by NICHIAS Corporation; thickness: 0.1 mm) was used, instead of Phen-DEZ, TBB (hexane solution with a concentration of 1.0 M) was used in the amount shown in Table 1, and the reaction temperature and the reaction conditions were changed as shown in Table 1.

The calculated graft ratio is shown in the "Graft ratio" column of Table 1.

Figure 16:
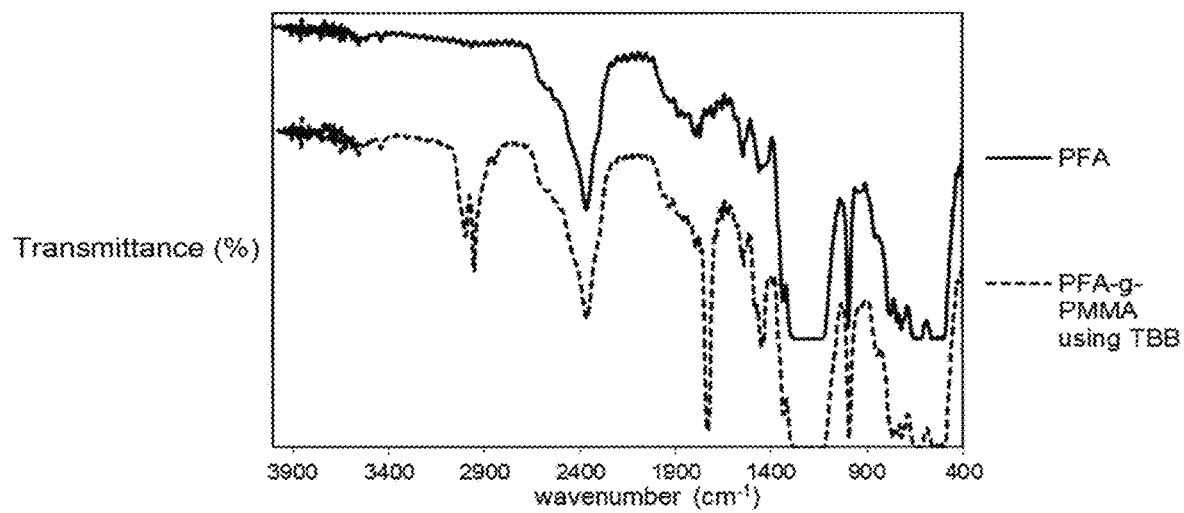
FIG. 16 is a chart showing the results of the FT-IR measurements of the PFA film before and after graft polymerization in Ex. 20.

In FIG. 16, the results of the FT-IR measurements of the PFA film before and after the graft polymerization in Ex. 20 are shown.

Figure 17:
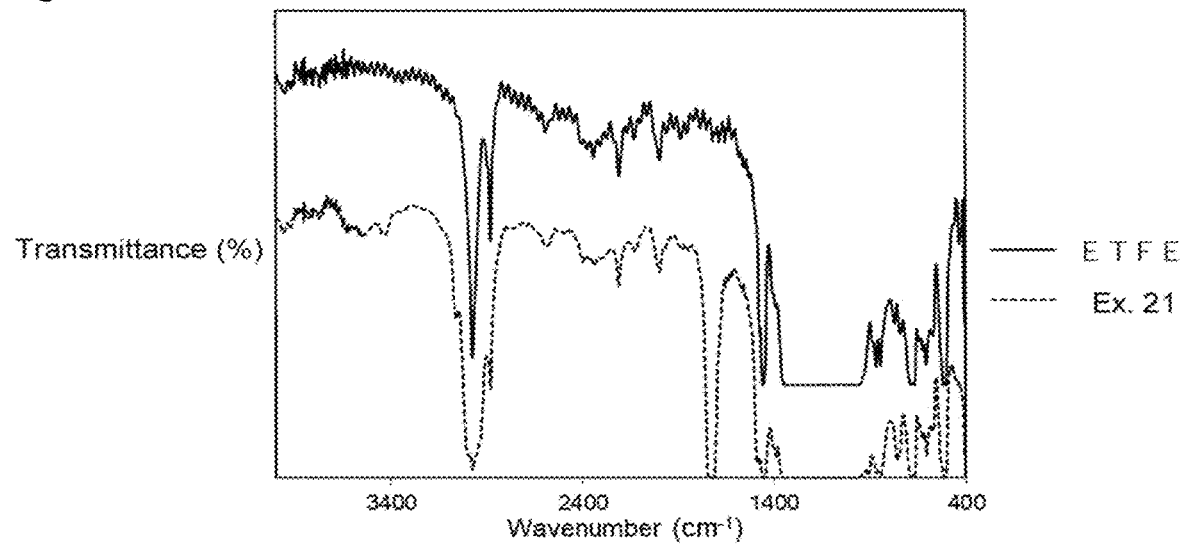
FIG. 17 is a chart showing the results of the FT-IR measurements of the ETFE film before and after graft polymerization in Ex. 21.

In FIG. 17, the results of the FT-IR measurements of the ETFE film before and after the graft polymerization in Ex. 21 are shown.

Figure 18:
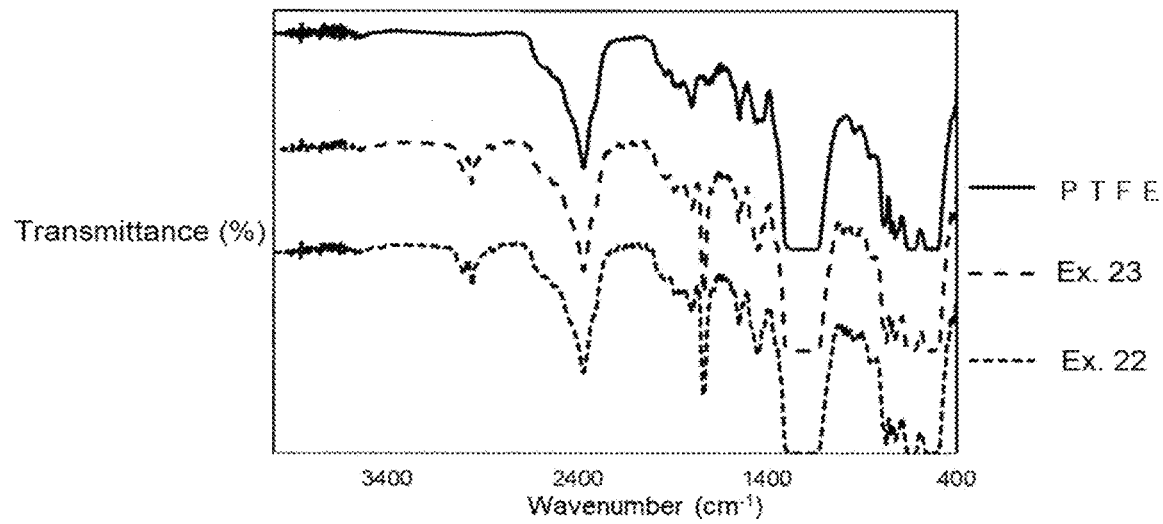
FIG. 18 is a chart showing the results of the FT-IR measurements of the PTFE films before and after graft polymerization in Ex. 22 (using toluene) and Ex. 23 (without using a solvent).

In FIG. 18, the results of the FT-IR measurements of the PTFE film before and after the graft polymerization in Ex. 22 (using toluene) and Ex. 23 (not using a solvent) are shown.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Substrate | Material | | ETFE | ETFE | ETFE | ETFE | ETFE | ETFE | ETFE | PVDF | ETFE | ETFE | ETFE |
| | Shape | | Film | Film | Film | Film | Film | Film | Film | Film | Film | Film | Film |
| Initiator | Phen-DEZ | [mmol] | 0.40 | 0.40 | 0.40 | 0.40 | 0.40 | 0.40 | 0.40 | 0.40 | | | |
| | | [mg] | 120 | 120 | 120 | 120 | 120 | 120 | 120 | 120 | | | |
| | TBB *[1] | [mmol] | | | | | | | | | 0.10 | 0.02 | 0.10 |
| | | [mL] | | | | | | | | | 1.0 | 0.2 | 1.0 |
| | TBB *[2] | [mmol] | | | | | | | | | | | |
| | | [mL] | | | | | | | | | | | |
| | BPO | [mmol] | | | | | | | | | | | |
| | | [mg] | | | | | | | | | | | |
| | AIBN | [mmol] | | | | | | | | | | | |
| | | [mg] | | | | | | | | | | | |
| Co-catalyst | $O_2$ | [mmol] | 0.40 | 0.40 | 0.40 | 0.40 | 0.40 | 0.40 | 0.40 | 0.40 | 0.10 | 0.02 | 0.10 |
| Radical reactive compound | MMA | [mmol] | 40 | 40 | 40 | 40 | 40 | | | 40 | | | |
| | GMA | [mmol] | | | | | | 40 | | | | | |
| | VP | [mmol] | | | | | | | 40 | | | | |
| | AA | [mmol] | | | | | | | | | 10 | 20 | 10 |
| Solvent | Toluene | [mL] | | | | | 2.0 | | | | | | |
| | SDS aqueous solution *[3] | [mL] | | | | | | | | | 3.2 | 20.0 | 3.2 |
| Reaction | Temperature | [° C.] | 23 | 50 | 50 | 50 | 50 | 50 | 50 | 50 | 50 | 60 | 50 |
| | Time | [h] | 18 | 1 | 6 | 18 | 18 | 3 | 8 | 8 | 1 | 24 | 3 |
| | Graft ratio | [%] | 2.1 | 1.4 | 5 | 8 | 2.9 | 0.34 | 0.28 | 7.8 | 0.38 | 0.64 | 1.1 |

TABLE 1-continued

| Properties | Water contact angle | [°] | | | | 66 | | | | | | | |
|---|---|---|---|---|---|---|---|---|---|---|---|---|---|
| | Water absorption capacity | [g/g] | | | | | | | | | | | 0.473 |

| | | | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|---|
| Substrate | Material Shape | | ETFE Film | PVDF Film | PFA Film | ETFE Particle | ETFE Film | ETFE Film | ETFE Film | PFA Film | PFA Film | PFA Film | PTFE Film | PTFE Film |
| Initiator | Phen-DEZ | [mmol] [mg] | | | | 0.40 120 | | | | | | | | |
| | TBB *1 | [mmol] [mL] | | | | | | | | | | | | |
| | TBB *2 | [mmol] [mL] | 0.40 0.4 | 0.40 0.4 | 0.40 0.4 | | | | | 0.40 0.4 | 0.40 0.4 | 0.30 0.3 | 0.40 0.4 | 0.40 0.4 |
| | BPO | [mmol] [mg] | | | | | | 0.40 120 | | | | | | |
| | AIBN | [mmol] [mg] | | | | | | | 0.10 30 | | | | | |
| Co-catalyst | O$_2$ | [mmol] | 0.40 | 0.40 | 0.40 | 0.40 | | | | 0.00 | 0.40 | 0.30 | 0.40 | 0.40 |
| Radical reactive compound | MMA | [mmol] | 40 | 40 | 40 | 37.7 | | 40 | 10 | 40 | 40 | | 40 | 40 |
| | GMA | [mmol] | | | | | | | | | | 7.5 | | |
| | VP | [mmol] | | | | | | | | | | | | |
| | AA | [mmol] | | | | | | | | | | | | |
| Solvent | Toluene | [mL] | | | | 2.0 | | 6.0 | 4.0 | 6.0 | 6.0 | 4.0 | 2.0 | |
| | SDS aqueous solution *3 | [mL] | | | | | | | | | | | | |
| Reaction | Temperature | [° C.] | 50 | 50 | 50 | 50 | | 85 | 70 | 50 | 50 | 50 | 50 | 50 |
| | Time | [h] | 8 | 8 | 8 | 24 | | 8 | 8 | 8 | 8 | 24 | 24 | 24 |
| | Graft ratio | [%] | 22.2 | 7.64 | 2.16 | | | 68.2 | 32.7 | 1.74 | 8.21 | 16.8 | 1.35 | 3.45 |
| Properties | Water contact angle | [°] | | | | | 95 | | | | | | | |
| | Water absorption capacity | [g/g] | | | | | 0.029 | | | | | | | |

Here, *1 to *3 in Table 1 are as follows.

TBB*1: n-Hexane solution with 0.1M concentration of TBB

TBB*2: n-Hexane solution with 1M concentration of TBB

SDS aqueous solution*3: Aqueous solution with 0.2 mass % concentration of SDS (sodium dodecyl sulfate)

[Explanation of Results]

In Ex. 1 to 15 and 19 to 23 corresponding to Examples of the present invention, it was possible to carry out the surface modification of the fluororesin by graft polymerization at a low temperature of at most 65° C. No change in the appearance such as warpage was observed in the film of the fluororesin.

In Ex. 17 and 18 corresponding to Comparative Examples, the surface modification of the fluororesin was carried out by graft polymerization at a high temperature of at least 70° C., but the graft ratio was too high, and further, warpage was observed in the film.

Ex. 16 corresponding to a Comparative Example, is an untreated ETFE film. The water contact angle was 95°, and the hydrophilicity of the surface was low. Further, the water absorption capacity was 0.029 g/g, indicating low water absorbency.

In Ex. 4 corresponding to an Example of the present invention, the water contact angle could be reduced to 66°, and the hydrophilicity was improved.

In Ex. 11 corresponding to an Example of the present invention, the water absorption capacity could be increased to 0.473 g/g, and the water absorbency was improved.

This application is a continuation of PCT Application No. PCT/JP2020/036399, filed on Sep. 25, 2020, which is based upon and claims the benefit of priority from Japanese Patent Application No. 2019-177652, filed on Sep. 27, 2019. The contents of those applications are incorporated herein by reference in their entireties.

What is claimed is:

1. A method for surface modification of a fluororesin, comprising:
   reacting a fluororesin with a radical reactive compound in the presence of an organometallic compound,
   wherein the fluororesin includes at least one selected from the group consisting of an ethylene-tetrafluoroethylene copolymer and a vinylidene fluoride polymer, and the organometallic compound includes a dialkyl zinc complex.

2. The method according to claim 1, wherein the fluororesin is in a film form or a particle form.

3. The method according to claim 1, wherein the fluororesin further includes at least one selected from the group consisting of a perfluoro (alkyl vinyl ether)-tetrafluoroethylene copolymer, a vinyl fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, a hexafluoropropylene-tetrafluoroethylene copolymer, an ethylene-hexafluoropropylene-tetrafluoroethylene copolymer, a chlorotrifluoroethylene polymer, an ethylene-chlorotrifluoroethylene copolymer, a polytetrafluoroethylene and a propylene-chlorotrifluoroethylene copolymer.

4. The method according to claim 1, wherein the organometallic compound includes at least one selected from the group consisting of a diethyl zinc 1,10-phenanthroline complex and a diethyl zinc 2,2'-bipyridine complex.

5. The method according to claim 1, wherein the radical reactive compound includes at least one selected from the group consisting of (meth)acrylic acid, a (meth)acrylate, a (meth)acrylonitrile, an N-substituted (meth)acrylamide, a vinyl ester, a vinyl ether, an aromatic vinyl compound and a heterocyclic vinyl compound.

6. The method according to claim 1, wherein the fluororesin and the radical reactive compound are reacted at a reaction temperature of in a range of 5 to 65° C.

7. The method according to claim 1, wherein the fluororesin is reacted with the radical reactive compound in the presence of the organometallic compound and a co-catalyst.

8. The method according to claim 7, wherein the co-catalyst is molecular oxygen.

9. The method according to claim 1, wherein the fluororesin is in a particle form and has an average particle size in a range of 0.1 to 1000 μm.

10. The method according to claim 1, wherein the method results in a grafting ratio of 0.0005% to 25%, where the grafting ratio={(mass of the fluororesin after the surface modification−mass of the fluororesin before the surface modification)/mass of the fluororesin before the surface modification}×100.

11. The method according to claim 1, wherein the fluororesin has a water contact angle of less than 95° after the reacting.

12. A method for surface modification of a fluororesin, comprising: reacting a fluororesin with a radical reactive compound in the presence of an organometallic compound, wherein the fluororesin is in a film form or a particle form and includes at least one selected from the group consisting of an ethylene-tetrafluoroethylene copolymer and a vinylidene fluoride polymer, and the organometallic compound includes at least one selected from the group consisting of a diethyl zinc 1,10-phenanthroline complex and a diethyl zinc 2,2'-bipyridine complex.

13. The method according to claim 12, wherein the fluororesin further includes at least one selected from the group consisting of a perfluoro (alkyl vinyl ether)-tetrafluoroethylene copolymer, a vinyl fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, a hexafluoropropylene-tetrafluoroethylene copolymer, an ethylene-hexafluoropropylene-tetrafluoroethylene copolymer, a chlorotrifluoroethylene polymer, an ethylene-chlorotrifluoroethylene copolymer, a polytetrafluoroethylene and a propylene-chlorotrifluoroethylene copolymer.

14. The method according to claim 12, wherein the radical reactive compound includes at least one selected from the group consisting of (meth)acrylic acid, a (meth)acrylate, a (meth)acrylonitrile, an N-substituted (meth)acrylamide, a vinyl ester, a vinyl ether, an aromatic vinyl compound and a heterocyclic vinyl compound.

15. The method according to claim 12, wherein the fluororesin and the radical reactive compound are reacted at a reaction temperature of in a range of 5 to 65° C.

16. The method according to claim 12, wherein the fluororesin is reacted with the radical reactive compound in the presence of the organometallic compound and a co-catalyst.

17. The method according to claim 16, wherein the co-catalyst is molecular oxygen.

18. The method according to claim 12, wherein the fluororesin is in a particle form and has an average particle size in a range of 0.1 to 1000 μm.

19. The method according to claim 12, wherein the method results in a grafting ratio $$\frac{\text{mass of the fluororesin after the surface modification} - \text{mass of the fluororesin before the surface modification}}{\text{mass of the fluororesin before the surface modification}} \times 100$$

of 0.0005% to 25%.

20. The method according to claim 12, wherein the fluororesin has a water contact angle of less than 95° after the reacting.

* * * * *